United States Patent [19]

Sakai et al.

[11] 3,768,958

[45] Oct. 30, 1973

[54] COMBUSTION APPARATUS FOR LIQUID FUEL

[75] Inventors: Nasatada Sakai, Akira Hara, both of Wakayama; Tamotsu Nomaguchi, Akio Ishida, Michio Fujiwara, Amagasaki, all of Japan

[73] Assignee: Mitsubishi Denki Kabushiki Kaisha, Tokyo, Japan

[22] Filed: Aug. 10, 1972

[21] Appl. No.: 279,368

[30] Foreign Application Priority Data
Aug. 10, 1971 Japan.............................. 46/60446
Oct. 13, 1971 Japan.............................. 46/94396
Oct. 20, 1971 Japan.............................. 46/83147
Mar. 31, 1972 Japan.............................. 47/32208

[52] U.S. Cl................................. 431/208, 431/216
[51] Int. Cl........................................... F23d 11/44
[58] Field of Search.............. 431/11, 37, 38, 208, 431/216, 162; 123/122 F, 122 AC

[56] References Cited
UNITED STATES PATENTS
3,653,794  4/1972  Shakiba.............................. 431/208
3,055,750  9/1962  De Carolis......................... 431/208

Primary Examiner—Carroll B. Dority, Jr.
Attorney—Norman F. Oblon et al.

[57] ABSTRACT

Combustion apparatus for utilizing liquid fuel having a fuel tank, a combustion air inlet, a vaporizer, a condenser, a combustion chamber, and a switching valve wherein the flow of a vaporized fuel may be recycled through the condenser for return to the fuel tank, or in the alternative, after the lapse of specific preheating time, the vaporized fuel may flow into the combustion chamber for initiation of the combustion process. Under recycle conditions, the flow passageways are pre-heated prior to combustion, while at the same time, heat exchange between the condensed fuel and the combustion air within the combustion air inlet permits the pre-heating of the combustion chamber per the flow of such heated combustion air.

7 Claims, 16 Drawing Figures (A)

(B)

PATENTED OCT 30 1973 3,768,958

COMBUSTION APPARATUS FOR LIQUID FUEL

BACKGROUND OF THE INVENTION

1. Field Of The Invention

The present invention relates generally to a combustion apparatus for liquid fuel, such as, for example, kerosene, and more particularly for an improved apparatus which provides a desirable amount of heat input to the combustion environment at the time corresponding, or just prior, to initiation of combustion for insuring rapid and stable combustion.

2. Description Of The Prior Art

Combustion apparatus for utilizing vaporized liquid fuel wherein the fuel is vaporized by electric heaters or heat of combustion is well known. Such conventional combustion apparatus has been advantageous when compared with those apparatus which pressurize the liquid fuel by a compressor and then spray it from a nozzle, or which vaporize the liquid fuel by centrifugal force of a rotary plate driven by a motor, from the viewpoint of complete vapor-ization of the fuel.

However, the conventional apparatus have disadvantages in that it takes a lot of time for the liquid fuel to reach the normal combustion state because of the delay in the rise of the temperature of the fuel vaporizing device, the liquid fuel supply, and the passageway supplying the vaporized fuel to the combustion chamber.

In addition, when air for the combustion process is supplied by means of a blower, the mixing ratio of the air and the fuel has been different at the times corresponding to that state of combustion operation wherein the temperature of the apparatus is still rising, i.e., during delay, and the state of normal combustion, so that the overall combustion and ignition has been unstable.

In general, then, combustion apparatus utilizing liquid fuel is constructed so as to pressurize the liquid fuel and spray it from a nozzle into a combustion chamber so as to simultaneously mix it with air supplied from a blower and subsequently ignite the mixture for combustion. However, the fuel spray, mixing, ignition, and combustion have heretofore been simultaneously conducted within the combustion chamber, so that it has been difficult to attain complete combustion due to the existing incomplete combustion conditions, such as, for example, non-uniform mixing and a slow combustion reaction.

In order to rapidly ignite the liquid fuel, such as, for example, kerosene, by heat vaporizing it, it is necessary to provide a switch valve at the output of the vaporizer to direct the passage of the vaporized fuel into a condenser of the combustion apparatus without supplying the vaporized fuel to the combustion chamber of the apparatus until the proper amount of fuel vaporized by the vaporizer, and the proper mixing ratio of air and vaporized fuel, is attained and stabilized.

However, when conventional three-way electromagnetic valves are employed for such purposes, the valve body is so near the electromagnetic coil that the coil's insulation deteriorates due to being overheated by the high temperatures of the vaporized fuel, such as, for example, 250°C – 350°C. On the other hand, in conventional valves which separate the electromagnetic coil from the valve per se, leakage in the valve sealing occurs which is quite dangerous as the vaporized fuel can escape.

Furthermore, the liquid fuel vaporizer and the combustion air heating chamber are heated to a specific temperature during the combustion operation in conventional combustion apparatus. However, it is necessary to heat both the vaporizer and the air chamber to a specific temperature prior to combustion by other heat sources such as, for example, an electric heater, in order to provide for complete and stable combustion from the beginning of initiation of combustion, without a delay time being incurred.

When kerosene is used as the liquid fuel, it is necessary to heat the kerosene to a temperature which will completely vaporize it, such as, for example, 250°C, and to heat the combustion air to a temperature which will not cause the vaporized fuel to subsequently condense, such as, for example, 100°C. However, when the liquid fuel vaporizer and the combustion air heating chamber are conventionally heated by a single electric heater, the vaporizer and the chamber are heated to the same temperature, such as, for example, a temperature exceeding 250°C, even though the required temperature for the liquf fuel and that required for the combustion air are necessarily different. Moreover, the heat capacity of the vaporizer is relatively high, so that a large amount of heat, and a long preheating time, is required.

SUMMARY OF THE INVENTION

Accordingly, it is an object of the present invention to provide an improved combustion apparatus which will vaporize and condense a liquid fuel before initiation of the normal combustion process so as to provide satisfactory preheating of the vaporizer, combustion air, and combustion environment, whereby the supply of a vaporized fuel reaches its normal combustion condition at the time corresponding to commencing supply of the fuel, and normal and stable combustion is able to be conducted from a time corresponding to initiation of combustion.

Another object of the present invention is to provide an improved combustion apparatus which advantageously places a valve at a position which experiences relatively low operating temperatures, wherein the supply or cut-off of fuel to the combustion chamber may be accomplished by the valve, the cut-off thereby recycling the condensed fuel to a fuel tank, and while supply enables fuel to proceed to the combustion chamber under proper conditions, and wherein smooth commencement and ceasing of combustion is attained so as to prevent leakage of vaporized fuel whereby the characteristic smell of combustion apparatus utilizing liquid fuel is prevented.

Still another object of the present invention is to provide an improved combustion apparatus for attaining complete combustion which will control the supply of liquid fuel to the combustion chamber until the complete combustion conditions are provided for the combustion air, the fuel, and the heat-exchange components, whereby the mixing of the vaporized fuel and the combustion air can be adjusted to the desired combustion conditions at the initiation of combustion while the incomplete combustion conditions, such as, for example, non-uniform mixing and delay of combustion, can be prevented.

Yet another object of the present invention is to provide an improved safety combustion apparatus for controlling the rise of temperature of the valve driving member wherein an actuation means for connecting the valve and the valve driving member is inserted within a vaporized fuel passage which is connected to a condenser, and the output of the actuation means is axially sealed whereby the vaporized fuel is passed to the axial seal member of the actuation means for a specific relatively short time before combustion and the pressure of the vaporized fuel upon the axial seal member is decreased by a pressure reducing effect when the vaporized fuel is passed through a passage having the actuation means inserted.

It is a further object of the present invention to provide an economical combustion apparatus having a heat controlling means for controlling the heat transmission between the liquid fuel vaporizer and the combustion air heating chamber, which are adjacent each other around the combustion chamber and heated by combustion heat, whereby the quantity of heat from the heat source for heating the liquid fuel vaporizer and the combustion air heating chamber can be effectively utilized and the respective operating temperatures of the liquid fuel vaporizer and the combustion air heating chamber can be attained within a relatively short time.

The foregoing objectives are achieved according to this invention through the provision of a combustion apparatus having a fuel tank, a vaporizer connected to the fuel tank, a condenser, a combustion chamber, and a combustion air inlet, there being a switch valve disposed between the vaporizer, condenser, and the combustion chamber, whereby vaporized fuel may be recycled through the condenser to the fuel tank prior to initiation of the combustion process, while the vaporized fuel may be allowed to flow to the combustion chamber for initiation of the combustion process, whereby the initial operation provides for pre-heating of the passageways prior to combustion. During condensation, the vaporized fuel performs a heat exchange function with the combustion air inlet, the heated air then flowing to the combustion chamber for heating the same. Sealing means are also provided for preventing the escape of vaporized fuel, and the other means are additionally provided for attaining the economical and proper heating of the vaporizer and the combustion air.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein.

DESCRIPTION OF THE PREFERRED EMBODIMENTS

Figure 1:
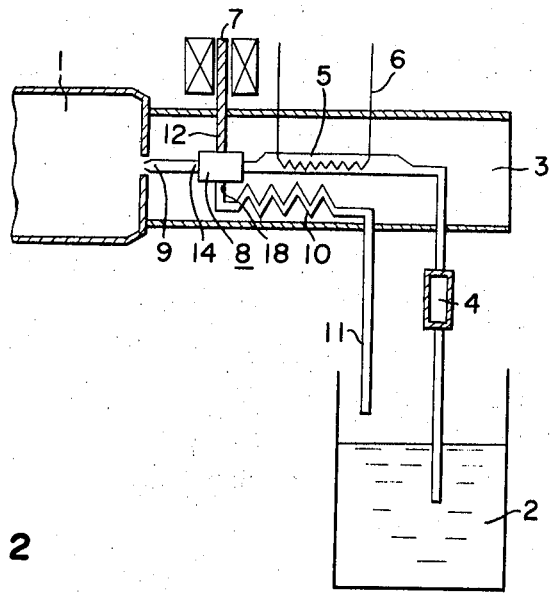
FIG. 1 is a schematic view, partly in cross-section, of one embodiment of a combustion apparatus utilizing liquid fuel constructed according to this invention and showing its cooperative parts.

Referring now to the drawings, and more particularly to FIG. 1 thereof, a schematic view, partly in cross-section, of one embodiment of this invention is disclosed, wherein the combustion apparatus comprises a combustion chamber 1, a fuel tank 2, a combustion air inlet 3 for supplying air to chamber 1, a fuel pump 4 for supplying fuel from tank 2 to chamber 1, a liquid fuel vaporizer 5 having disposed therein an electric heater coil 6 for vaporizing fuel delivered from tank 2, an electromagnet 7 for actuating a vaporized fuel switching member 8 which provides for the delivery of vaporized fuel to either nozzle 9 or condenser 10, and a pipe 11 for recycling condensed liquid fuel from condenser 10 to fuel tank 2.

Figure 2:
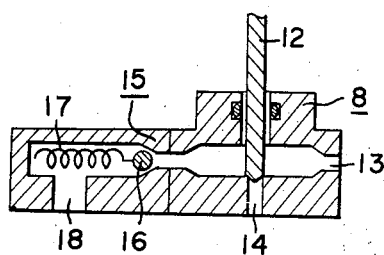
FIG. 2 is a diagrammatic illustration of a vaporized fuel switching means being designed for use in the combustion apparatus of FIG. 1.

Referring now to FIG. 2, a detailed construction of the vaporized fuel switching member 8 is disclosed, member 8 having a valve 12, an inlet 13 which delivers the liquid fuel vaporized within vaporizer 5, an outlet 14 for supplying vaporized liquid fuel to the nozzle 9, a relief valve 15 for supplying vaporized fuel to the condenser 10, via an outlet 18, when the pressure of the vaporized fuel exceeds a specific value, and a spring 17 for compressing the ball check valve 16 of the relief valve 15 with a suitable pressure $P_R$. The pressure $P_R$ is set such that relief valve 15 is closed when the valve 12 is raised by electromagnet 7 so as to open the outlet passageway 14 leading to nozzle 9.

When the electric heater coil 6 is actuated, thereby preheating vaporizer 5, as well as a blower, not shown in the drawings, so as to initiate supply of combustion air from combustion air inlet 3, and the fuel pump 4 for supplying fuel from fuel tank 2 to the vaporizer 5, the fuel is vaporized and the pressure in the vaporizer 5 is raised. When the pressure exceeds the specific value $P_R$, the relief valve 15 is opened so as to supply the vaporized fuel through the outlet 18 to the condenser 10. The condenser 10 is simultaneously being cooled by air supplied from the combustion air inlet 3 and accordingly, the vaporized fuel is rapidly cooled and condensed. Such fuel is returned, through the pipe 11, to the fuel tank 2. Furthermore, however, the combustion air is being heated through heat exchange with the vaporized fuel within the condenser 10, and accordingly, the combustion chamber 1 and the passageway 14, for supplying the vaporized fuel to the combustion chamber 1, as well as nozzle 9, are preheated by the heated combustion air to provide the conditions suitable for combustion. when the electromagnet 7 is actuated under such existing conditions, so as to operate valve 12 which will switch the flow of the vaporized fuel within the vaporized fuel switch member 8 to the outlet 14 and nozzle 9, the fuel is then supplied to the combustion chamber 1 so as to provide for stable combustion at the beginning of the combustion operation.

Figure 3:
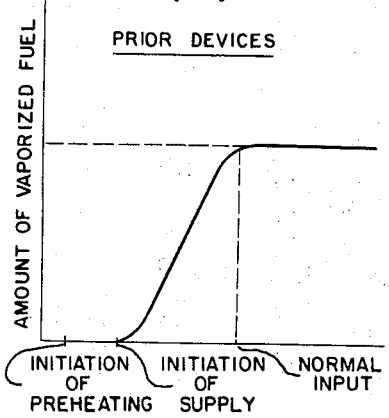
FIGS. 3a and 3b are graphs showing the characteristics of supplying vaporized fuel within a conventional system, and that within the system of this invention, respectively.
Figure 3:
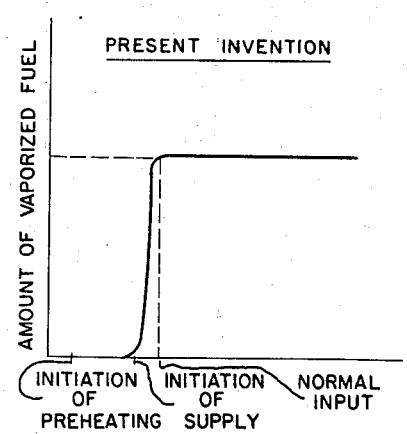

With particular reference to FIGS. 3a and 3b, there is disclosed a set of graphs showing the characteristics of supplying vaporized fuel within a conventional system and that within the system of this invention, respectively. For example, FIG. 3a discloses the amount of vaporized fuel supplied during the time beginning with the initiation of preheating of the fuel vaporizer, continuing through the initiation of fuel supply, and ending with the attainment of normal conditions at which time the fuel supply has reached the level of normal input.

FIG. 3b discloses similar situations, although it is noted that with the system of the present invention, the time it takes to attain normal input after commencement of fuel supply is substantially more rapid than that occurring within the conventional systems, the present invention thereby providing apparatus which rapidly attains stable combustion utilizing liquid fuel which is similar to combustion apparatus utilizing gaseous fuel.

Accordingly, the control system of the combustion apparatus of the present invention is substantially more simplified than that of conventional apparatus and is enabled to attain complete combustion while preventing the formation of soot. In the combustion apparatus of this invention, the mixing ratio of air and fuel is constant from the commencement of combustion throughout the process, making it possible to easily provide complete combustion, ie., blue frame combustion, with a high primary air rate, being the same as the combustion apparatus which utilizes gaseous fuel, even though it is combustion apparatus utilizing liquid fuel.

Figure 4:
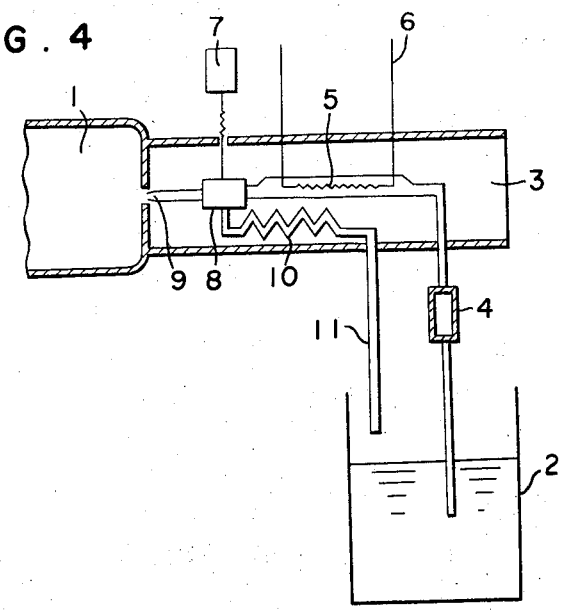
FIG. 4 is a schematic view, partly in cross-section, of another embodiment of a combustion apparatus utilizing liquid fuel constructed according to this invention and showing its cooperative parts.

Referring to FIG. 4, another embodiment of the present invention is disclosed which similarly comprises a combustion chamber 1, a fuel tank 2, a combustion air inlet 3, a fuel pump 4, a liquid fuel vaporizer 5 having an electric heater coil 6 disposed therein, a solenoid 7 for actuating a valve body of a vaporized fuel switching member 8 so as to control the direction of vaporized fuel to either a nozzle 9 leading to combustion chamber 1 or to a condenser 10 and a pipe 11 for recycling the condensed liquid fuel from condenser 10 to the fuel tank 2.

Figure 5:
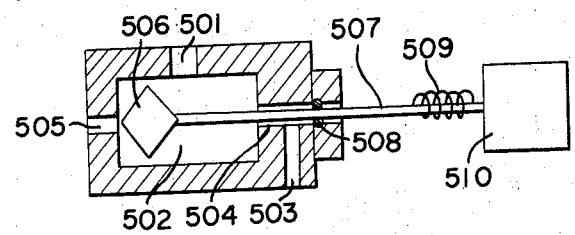
FIG. 5 is a diagrammatic illustration of a vaporized fuel switching means being designed for use in the combustion apparatus of FIG. 4.

Disclosed in detail in FIG. 5 is an enlarged illustration of the detailed construction of the vaporized fuel switching member 8 which has a first passageway 501 through which the vaporized fuel is passed from the vaporizer 5 into an interior chamber 502 of member 8. A second passageway 503 is also provided through which the fuel may be passed to the condenser 10, passageway 504 interconnecting chamber 502 with passageway 503. Similarly, a third port or passageway 505 connects chamber 502 with the nozzle 9 leading to combustion chamber 1.

A valve 506 is operatively associated with port 505, and is actuated by a valve stem 507 which extends through chamber 502 and passageway 504. Surroundingly engaging valve stem 507, exteriorly of switching member 8, is a sealing member 508, and disposed upon valve stem 507 at a further downstream position is a coil spring 509 for providing a biased connection between the valve stem 507 and an iron core piece 510 which is driven by the solenoid 7.

In operation, when passageway 505 is closed by appropriate actuation of the valve member 506, the electric heater coil 6 is actuated whereby the vaporizer 5 is satisfactorily preheated to permit the initiation or entrance of a supply of air from the combustion air inlet 3 by means of a blower, not shown in the drawing. Fuel pump 4 is actuated together with the supply of combustion air, in order to supply fuel to the vaporizer 5. The fuel is consequently vaporized and is supplied via passageway 501 into chamber 502 of the vaporized fuel switching member 8 to be passed through port or passageway 503 to the condenser 10 wherein the vaporized fuel is subsequently condensed to liquid for its return to fuel tank 2.

After attaining proper pre-combustion conditions and thereby stabilizing the flow of the vaporized fuel, valve 506 is driven by the solenoid 7 to its open position thereby permitting a flow of fuel from passageway 501 and chamber 502 out through pasageway 505, in lieu of passage through port 503 which is now blocked by valve member 506, so as to permit the passage of fuel to combustion chamber 1. Combustion is then initiated by ignition to provide normal stable combustion at the time of initiation of the combustion process. The characteristics of fuel supply shown in FIG. 3b apply equally well to this embodiment.

Figure 6:
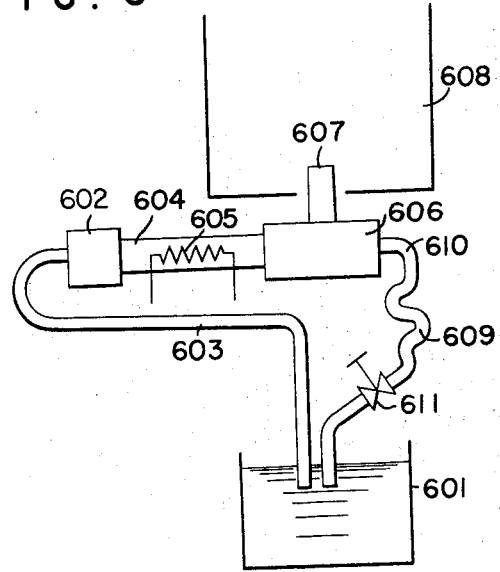
FIG. 6 is a schematic view, partly in cross-section, of still another embodiment of a combustion apparatus utilizing liquid fuel constructed according to this invention and showing its cooperative parts.

Referring now to FIG. 6, still another embodiment of the present invention is disclosed, this embodiment similarly having a fuel tank 601, a fuel pump 602, a fuel pipe 603 for connecting tank 601 with pump 602, a vaporizer 604 containing an electric heater coil 605, a vaporized fuel switching member 606, a fuel inlet 607 connecting the vaporized fuel switching member 606 to the combustion chamber 608, a condenser 609 which is connected to the vaporized fuel switching member 606 via passageway 610, and an open-shut valve 611 interposed between condenser 609 and fuel tank 601.

Figure 7:
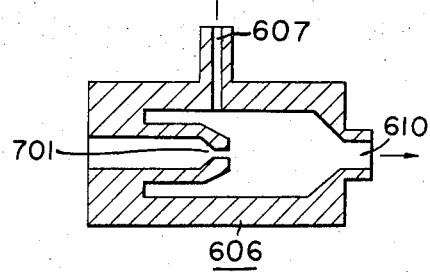
FIG. 7 is a sectional view of a vaporized fuel switching means of the combustion apparatus of FIG. 6.

Disclosed in detail in FIG. 7 is a sectional view of the switching member 606 which has a nozzle 701 at one end for spraying the vaporized fuel from the vaporizer 604. When the vaporizer 604 is heated by the electric heater coil 605 and reaches a suitable, pre-determined temperature, the fuel pump 602 is actuated so as to supply fuel from the fuel tank 601 through the fuel pipe 603 into the vaporizer 604. The vaporized fuel is then sprayed from the nozzle 701 toward and out the passageway 610 where it is subsequently condensed within the condenser 609 for return, through the valve 611 which is at this time maintained in its open condition, to the fuel tank 601.

When the valve 611 is in its closed position, the passageway 610 and the condenser 609 are pressurized with the liquid or vaporized fuel, and thus, vaporized fuel injected from the nozzle 701 into member 606, passes to the fuel inlet 607 for conduction to the combustion chamber 608, to initiate the combustion operation. When the combustion ceases, the fuel remaining within the passageway 610 and the condenser 609 is returned, through the valve 611, to the fuel tank 601, and the flow of the vaporized fuel injected from the nozzle 701 is passed toward the passageway 610 whereby the supply of the fuel to the combustion chamber 608 is terminated so as to cease the combustion. As is apparent from FIG. 7, the nozzle 701, passageway 610, and the fuel inlet 607 form an ejector structure which employs the vaporized fuel as a functional flow. Accordingly, the vaporized fuel is passed from the nozzle 701, and when the valve 611 is opened, the vaporized fuel is not leaked from the fuel inlet 607 to the combustion chamber 608.

Figure 8:
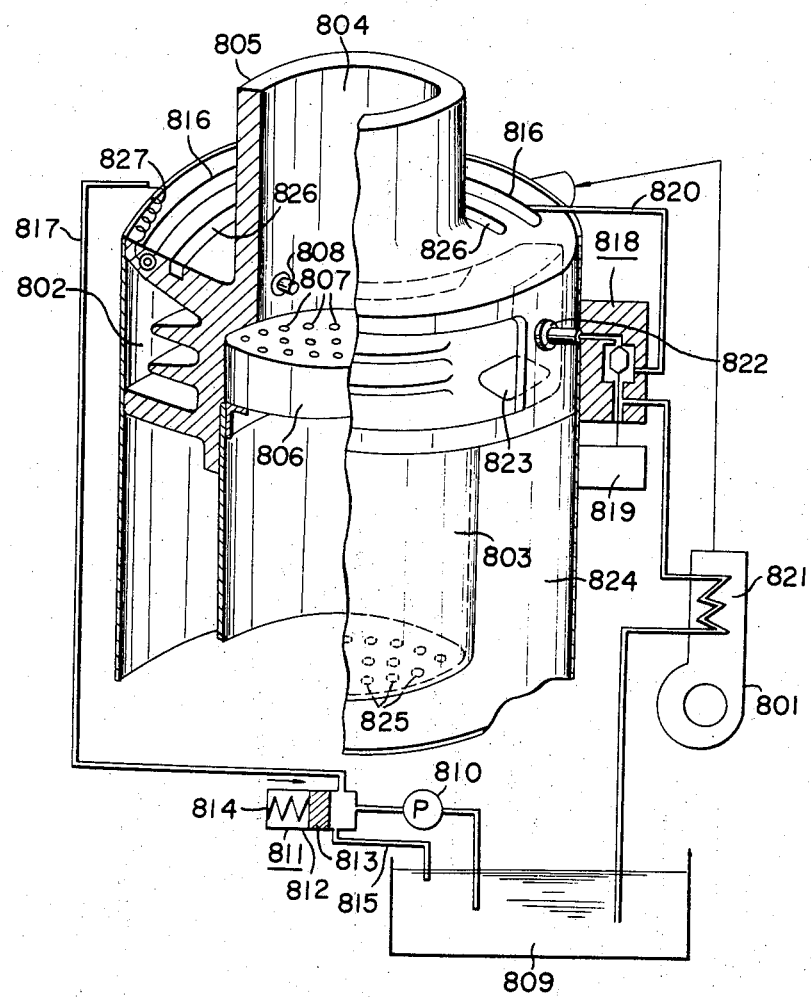
FIG. 8 is a schematic, perspective view, with parts broken away, of yet another embodiment of a combustion apparatus utilizing liquid fuel constructed according to this invention and showing its cooperative parts.

Referring now to FIG. 8, there is disclosed yet another embodiment of the present invention which has a blower or fan 801 for introducing the combustion air, a combustion air heating chamber 802 concentrically located about a cylindrical combustion chamber 804 and a gas mixture collection chamber 803 which introduces the mixture of the combustion air and the vaporized fuel into combustion chamber 804 for burning, and a combustion plate 806, situated between mixing chamber 803 and combustion chamber 804, having many flame holes 807 therein. An ignition plug 808, for igniting the gas mixture, is laced within the combustion chamber 804.

A liquid fuel source 809 for housing fuel, such as, for example, kerosene, fuel pump 810, and a constant pressure means 811, form the liquid fuel supplier. The constant pressure means 811 comprises a body 812 having therein a valve 813 and a coil spring 814 for usually compressing the valve 813 in the direction of the arrow, whereby the liquid fuel may be returned back through a by-pass pipe 815 to the fuel source 809 when the liquid fuel pressure becomes too high.

A substantially semi-circular liquid fuel vaporizer 816 is connected to a liquid fuel inlet pipe 817 which is in turn connected to the liquid fuel supplier so as to vaporize the liquid fuel by heating such utilizing the heat generated by the combustion. A switching valve 818 is actuated by a valve actuator 819 and serves to supply the vaporized fuel, supplied from the liquid fuel vaporizer 816 through a vaporized fuel outlet 820, to a condenser 821 for a specific pre-heating time prior to combustion, after which it may be supplied to a pre-combustion chamber nozzle 822 to be delivered to the combustion chamber for combustion, as will be more fully apparent hereinafter. The condenser 821 condenses the vaporized fuel by heat-exchange with the combustion air introduced by the blower 801 and the fuel is then returned to the fuel source 809 as a liquid fuel.

The nozzle 822 injects the vaporized fuel supplied to it through the switching valve 818 afte the specific pre-heating time. A mixing chamber 823 forms the gas mixture by mixing the injected vaporized fuel with the combustion air supplied from the heating chamber 802, while a gas mixture passageway 824 is concentrically formed about the gas mixture collecting chamber 803, linear flow holes 825 serving to connect the gas mixture collecting chamber 803 with the gas mixture passageway 824 at the bottom of the gas mixture collecting chamber 803. A substantially semi-circular heater 826 is encased within the walls 805 of the combustion chamber 804.

Figure 9:
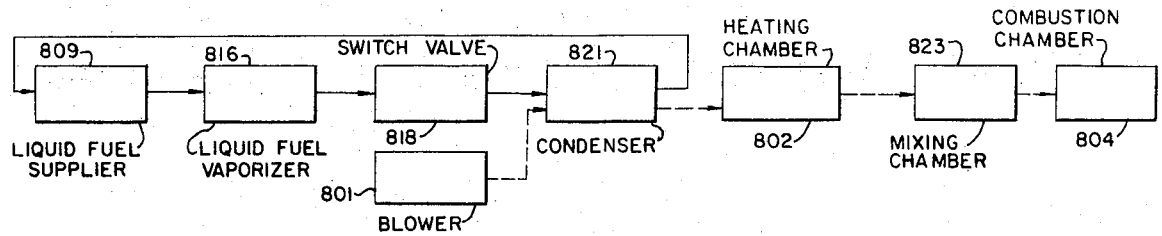
FIG. 9 is a flow diagram of the combustion system of the combustion apparatus of FIG. 8 prior to the initiation of combustion.

In operation, the heater 826, the pump 810, and the blower 801 are actuated for a specific time prior to combustion, whereby the walls 805 of the combustion chamber 804 and the liquid fuel vaporizer 816 become heated by heater 826. The liquid fuel is supplied through the constant pressure means 811 and the liquid fuel inlet 817 to the liquid fuel vaporizer 816 by means of the pump 810, as shown in full lines of the flow diagram of FIG. 9, so as to vaporize the fuel by heating it in the vaporizer.

The resulting vaporized fuel is then supplied to the switch valve 818, where the vaporized fuel is passed to the condenser 821 due to the fact that the passage to the nozzle 822 of the switch valve 818 is closed while the passage to the condenser 821 is open, the time corresponding to pre-combustion heating. In the condenser 821, the vaporized fuel is heat-exchanged with the combustion air introduced by the blower 801 as shown in the dotted lines of the flow diagram of FIG. 9, whereby the vaporized fuel is condensed so as to form liquid fuel and consequently, is returned to the fuel source 809. On the other hand, the combustion air heat-exchanged with the vaporized fuel has been consequently heated to a high temperature and is supplied through the heating chamber 802, the mixing chamber 823, the gas mixture passageway 824, and the gas mixture collecting chamber 803 via flow holes 825 and into the combustion chamber 804, whereby the passages are preheated by the accummulated heat contained in the combustion air. Accordingly, during the specific time prior to combustion, the delay of raising the temperature of the passage of the pump 810, the heater 826, and the liquid fuel vaporizer 816, is prevented.

Figure 10:
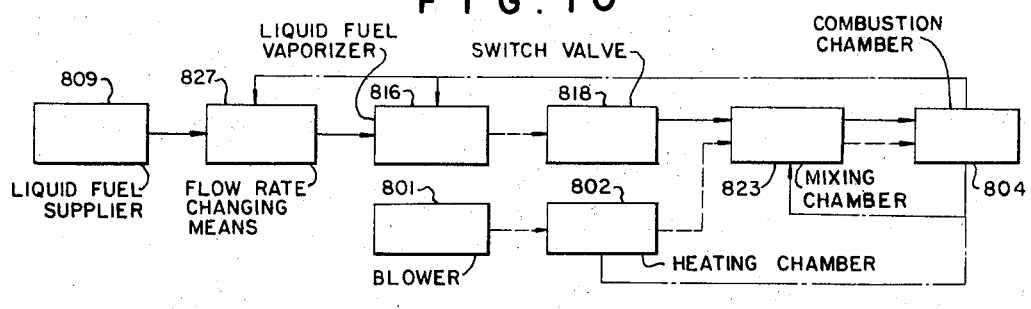
FIG. 10 is a flow diagram of the combustion system of the combustion apparatus of FIG. 8 at the time of combustion.

After a lapse of a specific pre-heating time, at the time of initiation of combustion, the operation of the heater 826 is terminated and simultaneously the switch valve 818 is switched so as to close the passage to the condenser 821 and open the passage to the nozzle 822. Accordingly, the vaporized fuel produced in the liquid fuel vaporizer 816 is now injected from the nozzle 822 into the preheated mixing chamber 823 as shown in the solid lines of the flow diagram of FIG. 10.

While in the mixing chamber 823, the vaporized fuel is mixed with the combustion air supplied through the preheated heating chamber 802 so as to produce the gas mixture. The gas mixture then flows through the gas mixture passageway 824 to the collecting chamber 803, and is further supplied through the flame holes 807 into the combustion chamber 804, whereupon the gas mixture is ignited by the ignition plug 808 to initiate combustion. When the combustion is initiated, the passages of the vaporizer 816, the heating chamber 802 and the mixing chamber 823 are heated by the combustion heat as shown in dotted lines in the flow diagram of FIG. 10.

Still referring to FIG. 8, a flow rate changing means 827, made of capillary tubing, may be provided for additionally heating the liquid fuel, passing through the inner part thereof, by the heat of combustion at the time of combustion, the flow rate changing means 817 being located between the liquid fuel vaporizer 816 and the liquid fuel inlet tube 817. When the flow rate changing means 827 is utilized, the liquid fuel passing through the means 827 is heated to a degree depending upon the heat exchange with the combustion heat at the time of combustion, the amount of supply of the liquid fuel to the vaporizer 816 being automatically controlled by the vaporizing operation. Accordingly, in each zone from the supply of the liquid fuel to the combustion chamber, the control for complete combustion is operated such that complete combustion is provided from the time of initiation of combustion.

Figure 11:
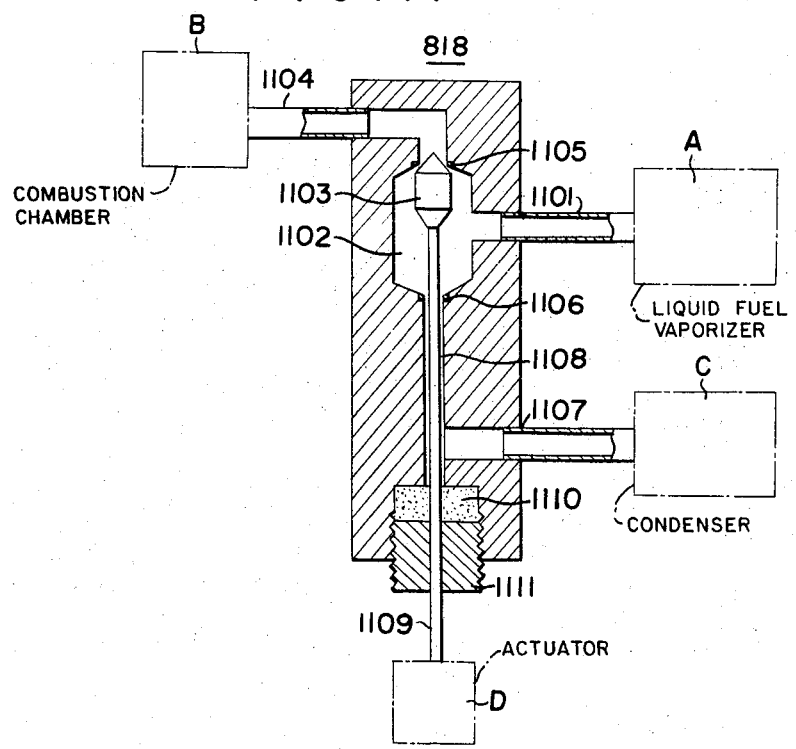
FIG. 11 is a sectional view of a switching valve of the combustion apparatus of FIG. 8.

Referring now to FIG. 11, there is disclosed another embodiment of the switch valve utilized for the combustion apparatus, which has a switch valve body 818, an upper passageway 1101 for vaporized fuel produced by heating liquid fuel in a liquid fuel vaporizer A, a valve casing formed within the valve body 818 and defining a valve chamber 1102 which connects with passageway 1101, a valve 1103 placed within valve chamber 1102, a vaporized fuel passage 1104, the entrance to which defines an upper valve seat 1105 for valve member 1103, connected to a combustion chamber B for mixing the vaporized fuel and combustion air, a lower valve seat 1106, and a reduced pressure passageway 1108 having a diameter smaller than those of the passages 1101 and 1104, for guiding the movement of valve stem 1109, which projects through the reduced pressure passageway 1108 and into chamber 1102 for actuating the valve 1103, which is driven by a driving means D, such as, for example, an electromagnetic actuator which is separated from the valve body 818. A lower vaporized fuel passageway 1107 connected to a condenser C for condensing the vaporized fuel is also connected to reduced pressure passageway 1108, while an axial sealing member 1110 seals the valve stem 1109 and the passageway 1108 relative to the environment exterior of valve body 818. An adjusting screw 1111 adjusts the amount of air pressure within the axial sealing member 1110.

The fuel which is vaporized by heating within the vaporizer A is supplied through the passage 1101 to the valve chamber 1102 at the time of initiation of combustion. However, the valve 1103 is seated upon its valve seat 1105, which leads to the combustion chamber B, by means of the driving means D at a specific time prior to combustion. Accordingly, the vaporized fuel is passed from the valve chamber 1102 through the lower valve seat 1106 to the reduced pressure passageway 1108. Since the valve stem 1109 projects through the passageway 1108, the sectional area of the passageway for permitting flow of the vaporized fuel is small, and consequently the vaporized fuel is decreased in pressure and is supplied through the passageway 1107 to the condenser C whereby it is condensed to a liquid and is recovered.

After a lapse of a specific pre-heating time, the vapor concentration of the vaporized fuel has reached a specific value, and valve seat 1106 is closed by actuation of valve 1103 through its valve stem 1109 by the driving means D, whereby the vaporized fuel is now supplied through valve seat 1105 and passageway 1104 to the combustion chamber B, for ignition and combustion.

Figure 12:
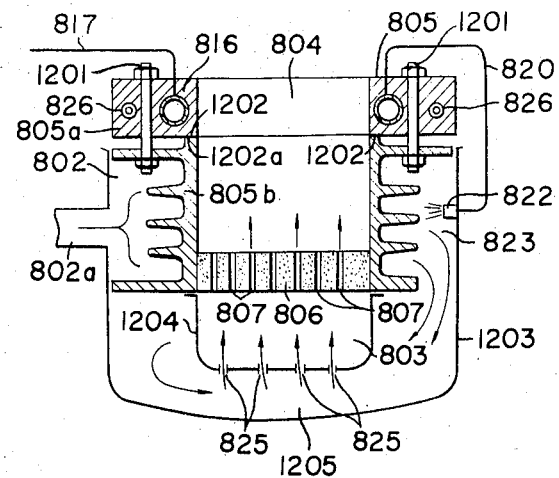
FIGS. 12, 13, 14 and 15 are sectional views of parts of the combustion chamber of the combustion apparatus of FIG. 8.

Referring now to FIG. 12, a detailed sectional view of the combustion chamber of the combustion apparatus of FIG. 8 is disclosed, which comprises a cylindrcal combustion chamber 804, and a wall 805, defining combustion chamber 804, made of heat conductive material having a relatively high heat capacity, and which is divided into a first body portion 805a and a second body portion 805b.

The liquid fuel vaporizer 816 is set within the first body portion 805a as is the heat source 826, such as, for example, an electric heater for heating the vaporizer 816 and the combustion air heating chamber. Bolt means 1201 are provided for separately connecting the first body portion 805a with the second body portion 805b. The face portion 1202 of the second body portion 805b contacts the first body portion 805a and forms therebetween a heat transmission means 1201a which also provides heat transmission resistance along the contact surfaces, the contact face portion 1202 of the second body portion 805b having a notably smaller sectional heat capacity area than that of the first body portion.

An outer casing 1203 has a specific gap from the outer wall of the second body portion 805b but serves to encase or cover it. The combustion air heating chamber 802 is formed between the outer wall of the second body portion 805b and the outer casing 1203. The apparatus also comprises a com-bustion air inlet 802a integrally formed with the outer casing 1203 and leading to chamber 802, a mixing chamber 823 for mixing the vaporized fuel produced in the liquid vaporizer 816, and delivered to nozzle 822, with the combustion air heated in the combustion air heating chamber 802, a liquid fuel inlet pipe 817 for supplying liquid fuel into the liquid fuel vaporizer 816, a vaporized fuel outlet pipt 820 for removing the vaporized fuel produced in the liquid fuel vaporizer 816 to switching valve 818, an injection nozzle 822 for injecting the vaporized fuel from the vaporized fuel outlet pipe 820 into the mixing chamber 823, a disc-shaped combustion plate 806 separating combustion chamber 804 from collecting chamber 803, plate 806 having a plurality of flame holes 807 and is provided so as to close the bottom of the combustion chamber 804, gas mixture collecting chamber 803 being formed by cylindrical wall section 1204 set under the combustion plate 806 and being spaced a specific distance from the outer casing 1203, a gas mixture passage 1205 having a U shape in cross-section which is formed between the gas mixture collecting chamber 803 and the outer casing 1203, and a plurality of connecting apertures 825 provided within the bottom of the cylindrical wall section 1204 for connecting the gas mixture collecting chamber 803 with the gas mixture passage 1205.

In operation, the heater 826 is actuated so as to pre-heat the body wall 805 at a time prior to combustion. However, in addition to heating wall 805, the heat of heater 826 is supplied mostly to the liquid fuel vaporizer 816 by the heat transmission resistance at the contact of the first body 805a and the second body 805b, while a small part of heat is transmitted from the first body 805a through the contacting face 1202 to the second body 805b so as to heat the air heating chamber 802. Accordingly, the effective utilization of the heat of the heater 826 is provided so as to attain the specific temperature within the vaporizer 816 that is in excess of 250°C. for vaporizing the liquid fuel, when kerosene is used as the liquid fuel, and about 100°–150°C. within the combustion air heating chamber 802, within quite a small period of time.

When the specific temperatures of the liquid fuel vaporizer 816 and the combustion air heating room 802 are respectively reached, the liquid fuel is supplied to the liquid fuel vaporizer 816 from the liquid fuel inlet pipe 817 while the combustion air is supplied from the combustion air inlet 802a to the combustion air heating chamber 802, the liquid fuel being vaporized while the combustion air is heated to the specific temperature, so that the combustion initiation conditions are present.

The vaporized fuel is then injected through the vaporized fuel outlet pipe 820 and the injection nozzle 822 to the mixing chamber 823 at the time of combustion, where such is mixed with the combustion air supplied through the combustion air heating chamber 802 to the mixing chamber 823. The resulting gas mixture is subsequently supplied through the gas mixture passage 1205, connecting apertures 825, the gas mixture collecting chamber 803 and the combustion plate 806 and into the combustion chamber 804 as shown by the flow arrows in full lines in FIG. 12. It is then ignited by the ignition plug (not shown in the drawing) in combustion chamber 804 whereby combustion is initiated. Upon initiating combustion, the operation of the heater 826 is terminated and the liquid fuel vaporizer 816 and the combustion air heating chamber 802 are consequently heated by the heat of combustion.

Figure 13:
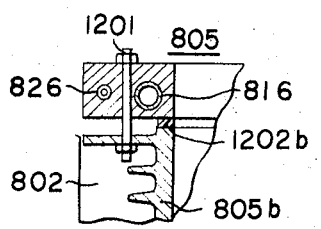

Although the heat transmission resistance means 1202a embodies a contacting face 1202 between the first and second bodies 805a and 805b respectively, it is possible to provide such means as a different material, such as, for example, a packing of stainless steel between the first body 805a and the second body 805b as shown in FIG. 13.

Figure 14:
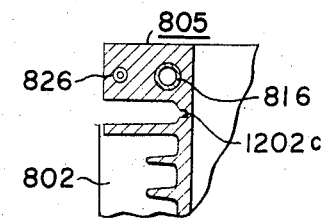
Figure 15:
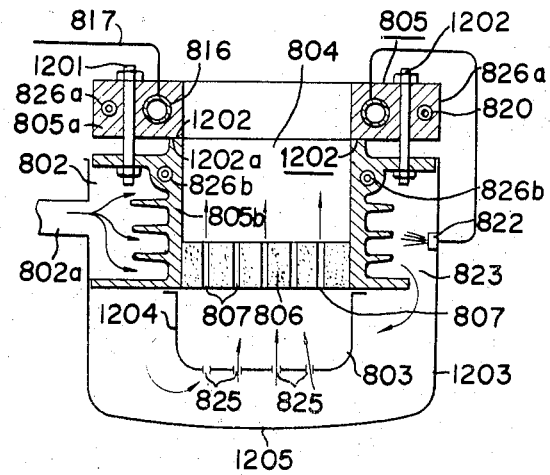

It is also possible to form the first and second bodies 805a and 805b from one piece and provide a groove 1202c between the liquid fuel vaporizer 816 and the combustion air heating chamber 802 which acts as the heat transmission resistance means as shown in FIG. 14. It is a further possibility to provide two separate heating sources 826a and 826b, which have different heat capacities, within the first body 805a and the second body 805b respectively, whereby the liquid fuel vaporizer 816 and the combustion air heating chamber 802 are heated by such separate heaters for attaining different operating temperatures, as shown in FIG. 15.

Obviously, many modifications and variations of the present invention are possible in light of the above teachings. It is to be understood, therefore, that within the scope of the appended claims the present invention may be practiced otherwise than as specifically described herein.

What is claimed as new and desired to be secured by Letters Patent of the United States is:

1. Combustion apparatus for utilizing liquid fuel comprising:
   a liquid fuel supplier;
   a vaporizer for vaporizing said liquid fuel supplied from said liquid fuel supplier;
   a condenser in communication with said fuel supplier;
   a combustion chamber; and
   a vaporized fuel switching means for switching the flow of said vaporized fuel produced in said vaporizer between said combustion chamber and said condenser, whereby all of said vaporized fuel is supplied to said condenser for a specific time prior to the initiation of combustion and wherein said vaporized fuel is supplied to said combustion chamber at the time of initiation of combustion.

2. Combustion apparatus for utilizing liquid fuel as set forth in claim 1, wherein said vaporized fuel switching means comprises a valve for opening a vaporized fuel passage to said combustion chamber at a specific time, and a relief valve for opening and supplying said vaporized fuel to said condenser when the pressure of said vaporized fuel exceeds a specific value.

3. Combustion apparatus for utilizing liquid fuel as set forth in claim 1, wherein said vaporized fuel switching means comprises a chamber for receiving said vaporized fuel from said vaporizer and a valve for switching and connecting said chamber to said condenser and said combustion chamber, at different times depending upon the stage of combustion.

4. Combustion apparatus for utilizing liquid fuel comprising:
   a fuel tank for said liquid fuel;
   a liquid fuel supplier;
   a vaporizer for vaporizing said liquid fuel supplied thereto from said fuel tank by said liquid fuel supplier;
   a nozzle connected with an outlet of said vaporizer;
   a condenser for condensing said vaporized fuel produced by said vaporizer which is disposed between said nozzle, via a passageway, and said fuel tank;
   a valve connected with an outlet of said condenser;
   a combustion chamber; and
   a fuel inlet for supplying said fuel to said combustion chamber being disposed between said condenser and said nozzle;
   whereby said nozzle, said passageway from said nozzle to said condenser, and said fuel inlet form an ejector structure so as to prevent a leak of said vaporized fuel, injected from said nozzle to said condenser, from said fuel inlet, at the time of no supply of the fuel to said combustion chamber;
   and whereby the supply and termination of said vaporized fuel to said combustion chamber is attained by opening and closing of said valve.

5. A combustion apparatus for utilizing liquid fuel comprising:
   a liquid fuel vaporizer for vaporizing said liquid fuel supplied from a liquid fuel supplier;
   a heating chamber for heating combustion air by heat generated at the time of combustion; a mixing chamber, for mixing said combustion air and said vaporized fuel, which is connected to said heating chamber;
   a condenser, for condensing said vaporized fuel by heat-exchange with said combustion air, which is connected to said liquid fuel supplier;
   a switch valve for switching the flow of said vaporized fuel produced in said vaporizer so as to recycle it through said condenser to said liquid fuel supplier at a specific time prior to the initiation of combustion, and to supply said vaporized fuel to said mixing chamber after said specific time; and
   a combustion chamber for burning said gas mixture formed in said mixing chamber.

6. Combustion apparatus for utilizing liquid fuel as set forth in claim 5, which further comprises a flow rate changing means for controlling the supply of liquid fuel from said liquid fuel supplier to said liquid fuel vaporizer by the vaporizing action of said heat of combustion upon said liquid fuel passing through said flow rate controlling means.

7. Combustion apparatus for utilizing liquid fuel as set forth in claim 5, wherein said switch valve comprises a valve chamber disposed between said combustion chamber and said condenser;
   a valve for supplying said vaporized fuel to said condenser for a specific time prior to the initiation of combustion and to said combustion chamber at the time of combustion; and
   a valve stem operating said valve from a position exterior of said valve, whereby said valve stem projects through a vaporized fuel passage connecting said valve chamber and said condenser, wherein said vaporized fuel passage is additionally connected to an outlet which is axially sealed.

* * * * *